United States Patent
Blahaerath et al.

(10) Patent No.: US 9,960,979 B1
(45) Date of Patent: May 1, 2018

(54) DATA MIGRATION SERVICE

(71) Applicant: Western Digital Technologies, Inc., Irvine, CA (US)

(72) Inventors: Grant C. Blahaerath, Redmond, WA (US); Gary J. Hooper, Alamo, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 213 days.

(21) Appl. No.: 13/965,066

(22) Filed: Aug. 12, 2013

Related U.S. Application Data (60) Provisional application No. 61/777,558, filed on Mar. 12, 2013.

(51) Int. Cl.
G06F 15/173 (2006.01)
H04L 12/26 (2006.01)

(52) U.S. Cl.
CPC ..................... *H04L 43/08* (2013.01)

(58) Field of Classification Search
CPC ............. G06F 3/0647; G06F 17/30079; G06F 17/30082; G06F 17/30221; G06F 17/3073; G06F 17/303
USPC ....... 709/212, 213, 223, 688, 692, 694, 802; 707/668, 692, 694, 802, 688
See application file for complete search history.

(56) References Cited

U.S. PATENT DOCUMENTS

| | | | |
|---|---|---|---|
| 5,767,390 A * | 6/1998 | Chapman, IV | 73/40.7 |
| 5,987,506 A * | 11/1999 | Carter | G06F 9/5016 707/999.01 |
| 6,336,187 B1 * | 1/2002 | Kern | G06F 21/10 713/161 |
| 7,155,605 B1 | 12/2006 | Cromer et al. | |
| 7,502,904 B2 * | 3/2009 | Furuhashi et al. | 711/165 |
| 7,797,500 B1 * | 9/2010 | Lewis | G06F 3/0619 711/162 |
| 7,831,833 B2 | 11/2010 | Gaylor | |
| 8,244,559 B2 | 8/2012 | Horvitz | |
| 8,244,850 B1 * | 8/2012 | Roussos et al. | 709/223 |
| 8,260,913 B2 | 9/2012 | Knapp et al. | |
| 8,296,827 B2 | 10/2012 | Paganetti et al. | |
| 8,364,925 B2 * | 1/2013 | Shibayama et al. | 711/165 |

(Continued)

OTHER PUBLICATIONS

U.S. Appl. No. 13/965,085, filed Aug. 12, 2013, to Grant C. Blahaerath et al., 27 pages.

*Primary Examiner* — Michael Y Won
(74) *Attorney, Agent, or Firm* — Chang & Hale LLP (57) ABSTRACT

Systems and methods for brokering storage services are disclosed. In one embodiment, the brokering system stores a mapping of stored data sets to online storage providers. The system can monitor one or more metrics associated with a plurality of online storage providers, identify one or more provider criteria associated with a first customer account, and obtain one or more metrics of a first storage provider storing a first data set associated with the first customer account. The system can determine whether to migrate the first data set based in part on the monitored metrics, the metrics of the first storage provider and the provider criteria. The system can auto-initiating migration of the first data set from the first storage provider to one or more selected storage providers of the plurality of online storage providers and update the mapping for the first data set.

20 Claims, 6 Drawing Sheets

(56) References Cited

U.S. PATENT DOCUMENTS

| | | | | |
|---|---|---|---|---|
| 8,639,775 B2* | 1/2014 | Nakagawa | G06F 3/0604 | |
| | | | 709/217 | |
| 8,706,697 B2* | 4/2014 | Morsi | G06F 17/30085 | |
| | | | 707/661 | |
| 8,719,891 B1* | 5/2014 | Aldrey | H04N 21/25866 | |
| | | | 725/105 | |
| 8,863,139 B2* | 10/2014 | Kakeda | G06F 3/067 | |
| | | | 711/114 | |
| 8,935,500 B1* | 1/2015 | Gulati et al. | 711/165 | |
| 9,223,501 B2* | 12/2015 | Terayama | G06F 9/45533 | |
| 2002/0082945 A1* | 6/2002 | Tenorio | G06F 17/30321 | |
| | | | 705/26.1 | |
| 2002/0087671 A1* | 7/2002 | Weisser et al. | 709/223 | |
| 2004/0235523 A1* | 11/2004 | Schrire et al. | 455/558 | |
| 2005/0165817 A1* | 7/2005 | O'Conor | G06Q 10/06 | |
| 2008/0080718 A1 | 4/2008 | Meijer et al. | | |
| 2008/0086616 A1* | 4/2008 | Asano et al. | 711/165 | |
| 2008/0114830 A1* | 5/2008 | Welingkar | G06F 17/30575 | |
| | | | 709/203 | |
| 2009/0164790 A1 | 6/2009 | Pogodin | | |
| 2009/0276771 A1* | 11/2009 | Nickolov | G06F 9/4856 | |
| | | | 717/177 | |
| 2009/0313320 A1 | 12/2009 | Parsons et al. | | |
| 2009/0313321 A1 | 12/2009 | Parsons et al. | | |
| 2009/0313363 A1 | 12/2009 | Parsons et al. | | |
| 2009/0313364 A1 | 12/2009 | Parsons et al. | | |
| 2010/0211781 A1 | 8/2010 | Auradkar et al. | | |
| 2010/0269008 A1 | 10/2010 | Leggette et al. | | |
| 2010/0281273 A1 | 11/2010 | Lee et al. | | |
| 2010/0325199 A1 | 12/2010 | Park et al. | | |
| 2010/0332818 A1 | 12/2010 | Prahlad et al. | | |
| 2010/0332820 A1* | 12/2010 | Matsushima | G06F 21/10 | |
| | | | 713/150 | |
| 2011/0022642 A1 | 1/2011 | deMilo et al. | | |
| 2011/0179111 A1* | 7/2011 | Ravichandran | G06Q 10/06 | |
| | | | 709/203 | |
| 2011/0179176 A1* | 7/2011 | Ravichandran | G06Q 10/06 | |
| | | | 709/226 | |
| 2011/0202732 A1* | 8/2011 | Montgomery | G06F 3/061 | |
| | | | 711/154 | |
| 2011/0225117 A1* | 9/2011 | Nakanishi | G06F 3/0605 | |
| | | | 707/602 | |
| 2011/0246433 A1 | 10/2011 | Sun | | |
| 2011/0264920 A1 | 10/2011 | Rieffel et al. | | |
| 2011/0306326 A1 | 12/2011 | Reed et al. | | |
| 2011/0320233 A1 | 12/2011 | Arnette et al. | | |
| 2012/0054253 A1 | 3/2012 | Guarraci | | |
| 2012/0054456 A1* | 3/2012 | Grube | G06F 3/0619 | |
| | | | 711/158 | |
| 2012/0136960 A1 | 5/2012 | Liu | | |
| 2012/0144110 A1* | 6/2012 | Smith | G06F 3/0607 | |
| | | | 711/114 | |
| 2012/0166576 A1 | 6/2012 | Orsini et al. | | |
| 2012/0166818 A1 | 6/2012 | Orsini et al. | | |
| 2012/0179909 A1 | 7/2012 | Sagi et al. | | |
| 2012/0185444 A1* | 7/2012 | Sparkes et al. | 707/689 | |
| 2012/0198065 A1 | 8/2012 | Sung | | |
| 2012/0226663 A1 | 9/2012 | Valdez Kline et al. | | |
| 2012/0233228 A1 | 9/2012 | Barton et al. | | |
| 2012/0233522 A1 | 9/2012 | Barton et al. | | |
| 2012/0239942 A1 | 9/2012 | Yan | | |
| 2012/0265976 A1 | 10/2012 | Spiers et al. | | |
| 2012/0266167 A1 | 10/2012 | Spiers et al. | | |
| 2012/0266213 A1 | 10/2012 | Spiers et al. | | |
| 2012/0266218 A1 | 10/2012 | Mattsson | | |
| 2012/0266231 A1 | 10/2012 | Spiers et al. | | |
| 2012/0266252 A1 | 10/2012 | Spiers et al. | | |
| 2012/0269348 A1 | 10/2012 | Rong et al. | | |
| 2012/0278371 A1 | 11/2012 | Montalvo et al. | | |
| 2012/0290950 A1* | 11/2012 | Rapaport | H04L 51/32 | |
| | | | 715/753 | |
| 2012/0303736 A1 | 11/2012 | Novotny et al. | | |
| 2012/0303791 A1* | 11/2012 | Calder | H04L 67/1002 | |
| | | | 709/224 | |
| 2012/0321080 A1* | 12/2012 | Candelore | H04N 21/42623 | |
| | | | 380/201 | |
| 2013/0080408 A1* | 3/2013 | Cashman | G06F 3/0608 | |
| | | | 707/692 | |
| 2013/0085989 A1* | 4/2013 | Nayyar | G06F 17/30079 | |
| | | | 707/610 | |
| 2013/0086580 A1* | 4/2013 | Simonsen | G06F 9/45558 | |
| | | | 718/1 | |
| 2013/0110967 A1* | 5/2013 | Ueoka | G06F 11/1435 | |
| | | | 709/214 | |
| 2013/0174176 A1* | 7/2013 | Kopylovitz | 718/105 | |
| 2013/0227111 A1* | 8/2013 | Wright et al. | 709/223 | |
| 2013/0246705 A1* | 9/2013 | Diare | 711/114 | |
| 2014/0278808 A1* | 9/2014 | Iyoob | G06Q 30/0206 | |
| | | | 705/7.35 | |
| 2014/0279201 A1* | 9/2014 | Iyoob | G06Q 30/0631 | |
| | | | 705/26.7 | |
| 2014/0281064 A1* | 9/2014 | Imazaki | G06F 13/20 | |
| | | | 710/74 | |
| 2015/0019195 A1* | 1/2015 | Davis | G06F 11/3447 | |
| | | | 703/17 | |
| 2015/0019197 A1* | 1/2015 | Higginson | G06F 17/303 | |
| | | | 703/22 | |
| 2015/0046745 A1* | 2/2015 | Dhavale | G06F 3/0647 | |
| | | | 714/4.11 | |
| 2015/0096011 A1* | 4/2015 | Watt | H04L 63/0272 | |
| | | | 726/15 | |
| 2015/0121131 A1* | 4/2015 | Kiselev | G06F 11/2082 | |
| | | | 714/6.23 | |
| 2015/0134708 A1* | 5/2015 | Cutforth | G06F 3/067 | |
| | | | 707/809 | |
| 2015/0139407 A1* | 5/2015 | Maguire | H04M 3/30 | |
| | | | 379/22.03 | |
| 2016/0019636 A1* | 1/2016 | Adapalli | G06Q 30/0641 | |
| | | | 705/26.62 | |

* cited by examiner

DATA MIGRATION SERVICE

CROSS-REFERENCE TO RELATED APPLICATIONS

This application claims priority to U.S. Provisional Application No. 61/777,558, entitled "CLOUD STORAGE BROKERING SERVICE," filed on Mar. 12, 2013, which is herein incorporated by reference in its entirety.

BACKGROUND

Today, cloud storage services have gained in popularity. Typically, a cloud storage service comprises two major components: (1) a web service that interfaces with the client and (2) a storage infrastructure. In conventional cloud storage services, the client can only access the storage infrastructure (and their files) through the web service. That is, the web service functions as a proxy for the client. Unfortunately, this structure ties the clients to a specific web service.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

While some vendors have attempted to provide access to multiple storage services, these solutions merely provide an interface to the various storage services. For example, some software clients provide interoperability amongst a plurality of storage services, such as Amazon S3, Dropbox, Box, G-drive, etc. However, the user must still manage and decide which storage service to use and the storage service configuration.

The present disclosure relates to methods and systems for brokering storage services among a plurality of available storage systems, including cloud storage services. In some embodiments, a storage broker can be coupled to a plurality of storage services. Each storage service may offer different features, costs, and capacity.

The storage broker offers the user or enterprise various storage configurations for their needs. The configurations may relate to any aspect, such as, level of security, redundancy, availability, cost, etc. Based on the desired configuration, the storage broker can then determine an appropriate or optimal combination of the available storage services. The storage broker can then establish the appropriate accounts with the selected storage services.

The storage broker can also maintain and/or provide to the user or enterprise the information needed to access their data, such as encryption keys, file location links, etc., thereby simplifying management of storage services. The storage broker may also update the combination of storage services periodically, continuously, or on demand to optimize for cost, availability, performance, etc.

Figure 1:
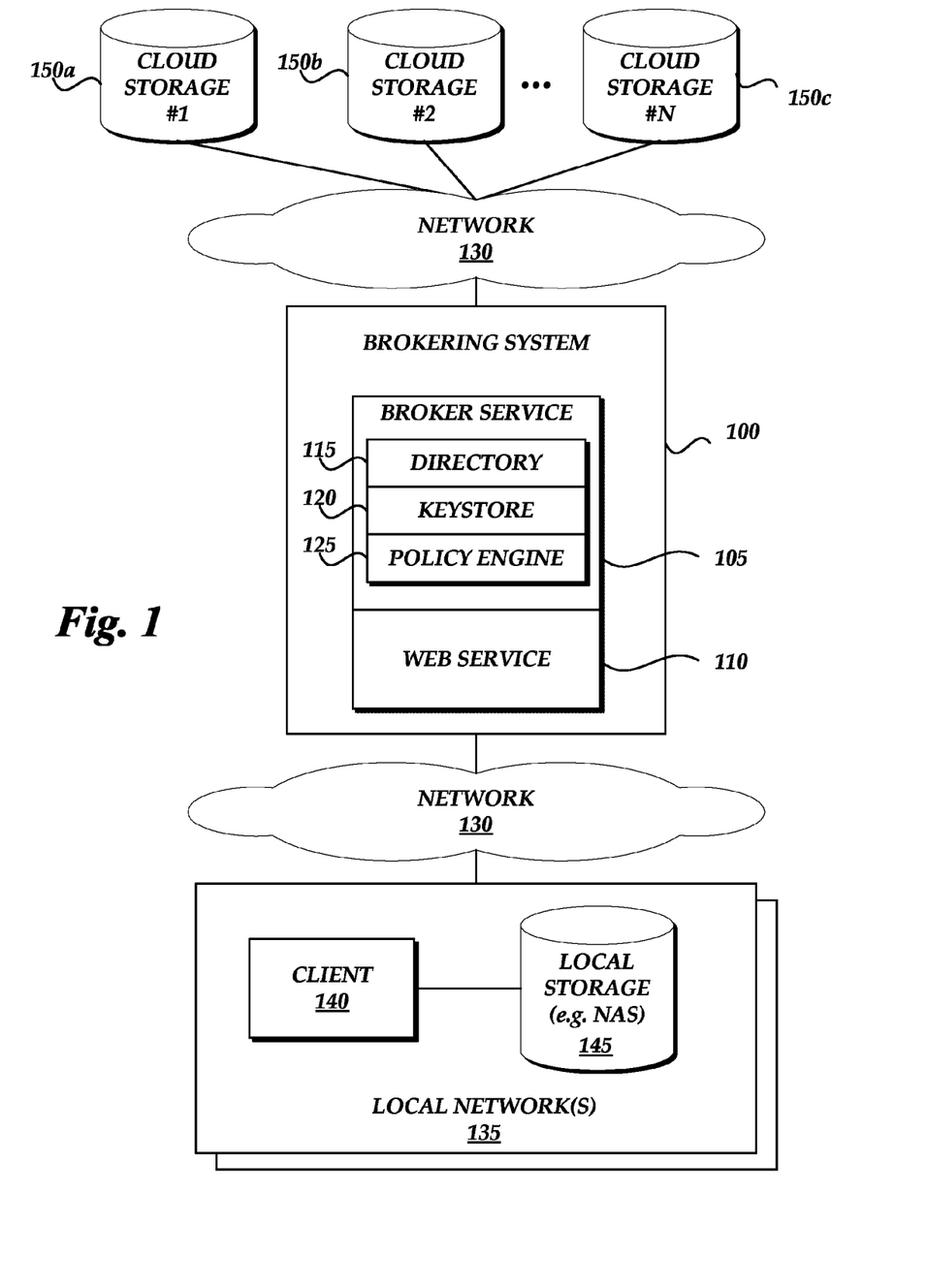
FIG. 1 illustrates an exemplary embodiment of a storage brokering system that provides a storage broker service that allows a user or enterprise to optimize its storage services.

FIG. 1 illustrates an exemplary embodiment of a storage brokering system 100 that provides a storage broker service 105 that allows a user or enterprise to optimize its storage services. In one embodiment, the brokering system 100 includes a web service 110 that provides clients with an interface (e.g., a web site, Application Programming Interface (API), or the like) to interact with the brokering system 100. Storage services from various providers may be brokered and combined according to any criteria, such as cost, availability, performance, capacity, etc. In one embodiment, the broker service 105 includes a directory 115, a keystore 120 and/or a policy engine 125, which are described in further detail below.

In the illustrated embodiment of FIG. 1, one or more client devices 140 (e.g., computer, laptop, smart phone, tablet or other computing device) operating on a local area network (LAN) 135 store data on one or more local storage devices (e.g., network attached storage (NAS) or the like). The local storage devices can communicate with the broker service (typically located on a wide area network (WAN) 130 such as the Internet, and accessible from the local area network 135) to request the brokering service to broker storage on various cloud storage services. In one embodiment, the local storage devices 145 communicate with the brokering system 100 via a wired or wireless network connection, through one or more intermediary systems (e.g., Internet Service Providers, cellular data networks, etc.). Multiple local storage devices 145 on multiple local networks 135 may be in communication with the brokering system 100.

In some embodiments, an individual user and/or enterprise (for convenience, hereinafter referred to as "user") may designate or specify desired criteria for their storage needs and submit them to the broker service. The broker service can then analyze the user's criteria and generate a storage lineup. The broker service may also establish the necessary accounts with the storage services (e.g., cloud storage #1-3 150a-c) and then make the storage combination available to the user. Alternatively, the brokering service may offer "pre-packaged storage plans" that employ pre-determined combinations of the storage services. In one embodiment, the brokering service optimizes or analyzes the mix of cloud storage services used by a client or enterprise.

In some embodiments, the brokering service determines an optimum configuration of cloud storage based on user criteria, etc. The brokering service may determine a mixture of selected cloud storage providers continuously or dynamically to comply with rules or other criteria. The brokering service, for example, may comprise a policy engine 125 that monitors user activity and changes to the cloud storage services and then revises the storage lineup accordingly. Changes that may prompt a revision to the cloud storage mixture may include, but are not limited to, new data centers or storage providers becoming available, price updates, outages, network traffic, locations of client demand, etc.

In other embodiments, the brokering service may offer synchronization services with local storage. For example, a storage device 145 (e.g., a NAS) may be configured to work with the brokering service via a client application running on the storage device. This allows the local storage 145 to serve as a local cache, backup, etc. to client devices 140 on the local network 135 by working cooperatively with the brokered storage. For example, the client device may access data stored on the local storage 145 when the client device is on the local network 135 for greater performance, but rely on the brokering system 100 to access the same data stored on the a cloud storage provider 150 when the client device is away from the local network 135.

Criteria for Brokering of Storage

In some embodiments, the brokering service may offer or employ a wide variety of criteria to broker the storage services, such as cost, availability, geographic location, legislative/regulatory compliance, security, data types, as well as other criteria. Below are some examples of various criteria and how they may be employed.

In some embodiments, the brokering service may receive a requested amount of storage from the user or enterprise. The brokering service may then calculate an optimal mix of storage services on a cost per size basis. The cost optimization may leverage the storage needs of one or more users/enterprises alone or in combination to achieve various savings.

In one embodiment, the brokering service may perform arbitrage of the storage services on a continuous, dynamic or periodic basis. For example, the brokering service may solicit offers from the storage service, e.g., in an open auction, or with closed bidding, on a monthly, weekly, daily basis. Depending on the offers, the brokering service may then migrate storage from one service to another to optimize cost. An arbitrage service is described in greater detail in FIG. 2.

In other embodiments, the brokering service may attempt to configure the storage services to maximize availability, for example, for sensitive documents. The brokering service may thus select storage services based on the location of their data centers, past availability data, service level agreements, etc.

In some embodiments, the brokering service may optimize for geographic dispersion so that data is distributed among geographically dispersed locations to improve performance and/or reliability. For example, in order to avoid geographic based service interruptions (e.g., caused by storms, power outages, telecom failures, etc.), data may be replicated in data centers in two or more different geographic areas. In one embodiment, the system provides a "Wide Area" RAID. In particular, the brokering service may distribute data with parity to different locations so that files can be reconstructed from portions distributed among different cloud storage services.

The storage brokering system can provide a more open architecture or "intrinsic" cloud service. In some embodiments, the brokering service still comprises a web service and a storage infrastructure. However, in the storage brokering system, the client may initially interface the web service to establish or otherwise provision storage space and security for its files. Then, in contrast to conventional cloud storage services, the client directly interfaces the storage space to upload and download its files. In this embodiment, the client has greater access and/or control over the storage space.

In some embodiments, the brokering service may optimize to comply with various legislative or regulatory requirements. For example, the brokering service may, for some types of data or clients, avoid storing certain types of data in foreign countries (such as China and Australia) due to ownership/security of data issues. The brokering service may also configure the storage lineup based on the type of data, such as banking data, Health Insurance Portability and Accountability Act (HIPAA) data, etc.

In yet other embodiments, the brokering service may attempt to optimize the storage service based on performance, such as access speed, latency, etc. For example, the brokering service may test or receive performance data that indicates the performance of the various storage services. Responsive to this information, the brokering service may then include or remove the various storage services from their offerings.

The brokering service may also select storage services based on encryption and/or security services offered by the storage services.

The brokering service may also select storage services based on the data type or files that are being stored. For example, the brokering service may prefer a storage service for movies and other storage services for documents, etc.

Arbitrage and Migration

In some embodiments, the brokering service offers a transparent migration between storage services. For example, if a client or enterprise wishes to migrate from one cloud storage to another, the brokering service may migrate these files transparently without requiring extensive effort or involvement of the client.

Furthermore, the brokering service may be configured to provide backup and recovery services automatically in the event of outages, slow performance, etc. These services may be based on a subscription, the data type, etc.

Figure 2:
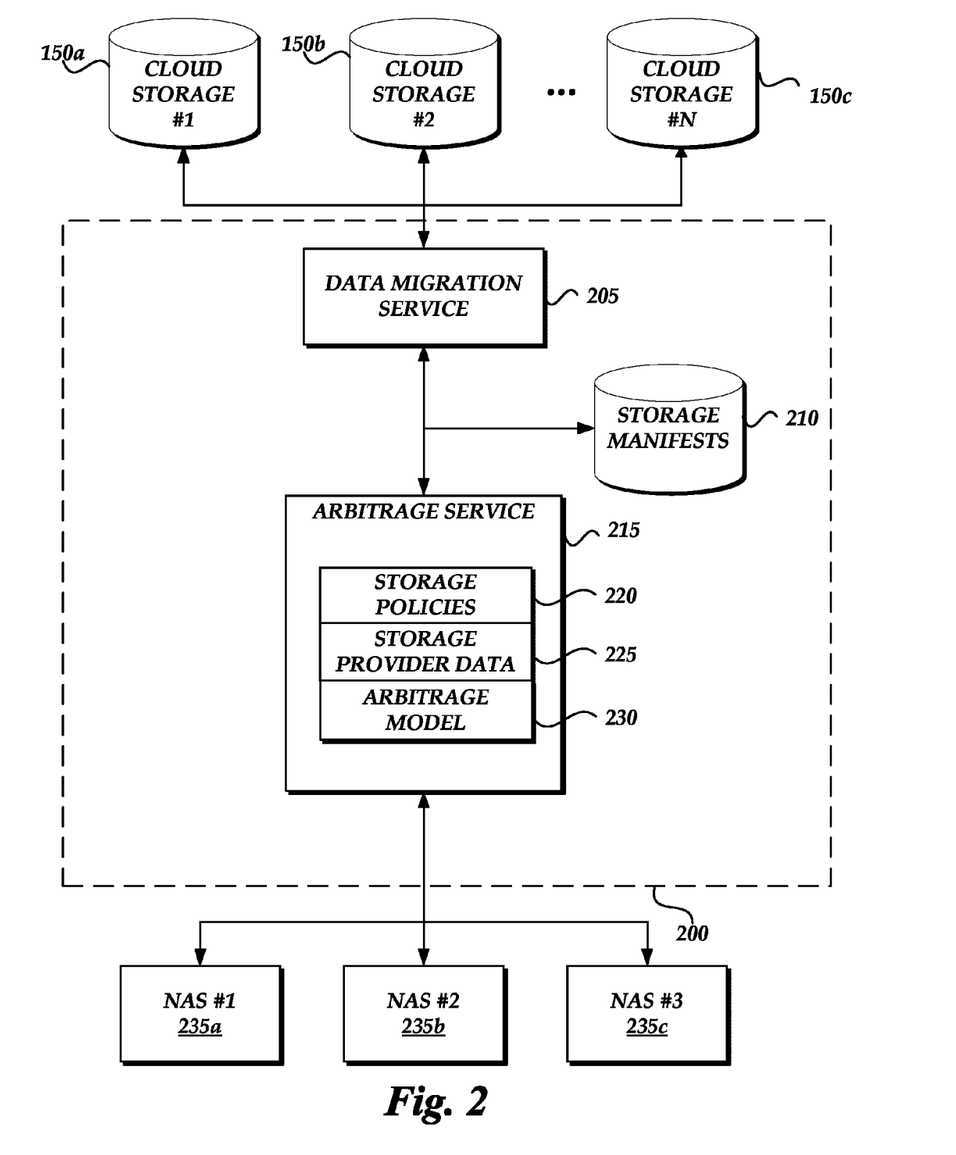
FIG. 2 illustrates another embodiment of the storage brokering system that is configured to automatically perform storage service arbitrage and migrate data from one storage provider to another.

FIG. 2 illustrates an embodiment of the brokering service 200 that is configured to automatically perform storage service arbitrage and migrate data from one storage provider to another. In some embodiments, the brokering service 105 of FIG. 1 includes some or all of the components of the brokering service 200 of FIG. 2. For example, the brokering service 105 of FIG. 1 may also perform arbitrage and data migration. However, for ease of explanation, the following describes these aspects of the brokering service 200 separately, as they may be performed independently of the previous aspects of the brokering service 105 of FIG. 1.

As illustrated in FIG. 2, the brokering service 200 includes a data migration service 205, an arbitrage service 215 and a data repository (e.g., database, flat file or other data structure stored on computer memory) for storing storage manifests 210. In one embodiment, the storage manifests reflect a mapping of stored data associated with respective customer accounts to the various cloud storage providers 150a-150c utilized by the brokering service 200.

In one embodiment, the data migration service 205 coordinates data transfers from one cloud storage service to another. For example, the data migration service 205 can provision storage space on a first cloud storage service 105a, copy data from a second cloud storage service 150b, and then delete the data from the second cloud storage service 150b. In some embodiments, the data migration service 205 may retain copies of the data on the source storage service during the migration, for example, in order to increase availability of the data and/or create backup copies. The data migration service 205 can then update the storage manifests 210 to reflect the new location of the transferred data.

In some embodiments, the arbitrage service 215 performs data arbitrage by monitoring various storage services and optimizing on one or more criteria (e.g., cost, performance, reliability, or the like) while ensuring the selected storage service meets or exceeds the requirements defined by the customer. If the arbitrage service 215 finds that an alternative storage provider improves on the one or more criteria as compared to a current storage provider, the arbitrage service 215 can cause the data migration service 205 to perform a data migration from the current storage provider to the alternative storage provider. For example, the arbitrage service 215 may be configured (e.g., by user storage policy rules) to optimize based on cost and would therefore move data to the lowest cost storage provider.

In one embodiment, the arbitrage service 215 continuously iterates over all storage policy rules and applies them to the arbitrage computational model. Each manifest and its associated rules can be used to query the model, which then generates a recommendation for a best fitting cloud storage service. This recommendation is compared to the manifest's current storage location. When the recommended location is more fit than the manifest location, a migration of that manifest is scheduled with the data migration service.

In one scenario, when the arbitrage service 215 computes an improvement to a data set's current storage location, it requests the data migration service 205 to perform a migration. The migration service can generate a migration plan and schedule the migration using a pool of data migration resources that provide computing and/or network capacity for migrating data. Plans may take into account current factors such as network load and time based variable pricing in deciding when the transfer will occur. After the stored data is transferred and verified, the storage manifest for the data set can be updated with the new location and the data in the old location can be scheduled for deletion.

The arbitrage service 215 can maintain or have access to various types of data in order to perform arbitrage operations. Such data can include storage policies 220, specifying the desired pricing, connectivity costs, geography, capacity, availability or other criteria of customers. Individual criterion can be grouped together into a customer policy rule defining the various desired criteria of a customer for a storage provider for a particular storage manifest. In one embodiment, each storage manifests is associated with one or more customer policy rules.

The arbitration service 215 may also maintain or have access to storage provider data 225, which can include a list of available cloud storage services 150 and characteristics of respective cloud storage services 150 such as pricing, connectivity costs, geography, capacity, availability, etc.

In one embodiment, the arbitrage service 215 maintains an arbitrage computational model 230 (e.g. embodied in a software application). The arbitrage computational model 230 can utilize the storage polices and/or the storage provider data 225 to determine the best place to store data. For example, given a particular storage policy rule for a first data set, the model 230 can select an appropriate storage provider based on the storage provider data. The determination may be periodically or intermittently recalculated, for example, on a regularly scheduled basis or when policy rules change.

Operations

In some embodiments of the storage brokering system, the web service provides a directory service that associates a unique key with a file in cloud storage. Bound with that key are the cloud platform specific details needed to access that file using the intrinsic storage service. The web service can also act as a gate keeper that generates time restricted tokens that the client uses to access the directory service.

Figure 3:
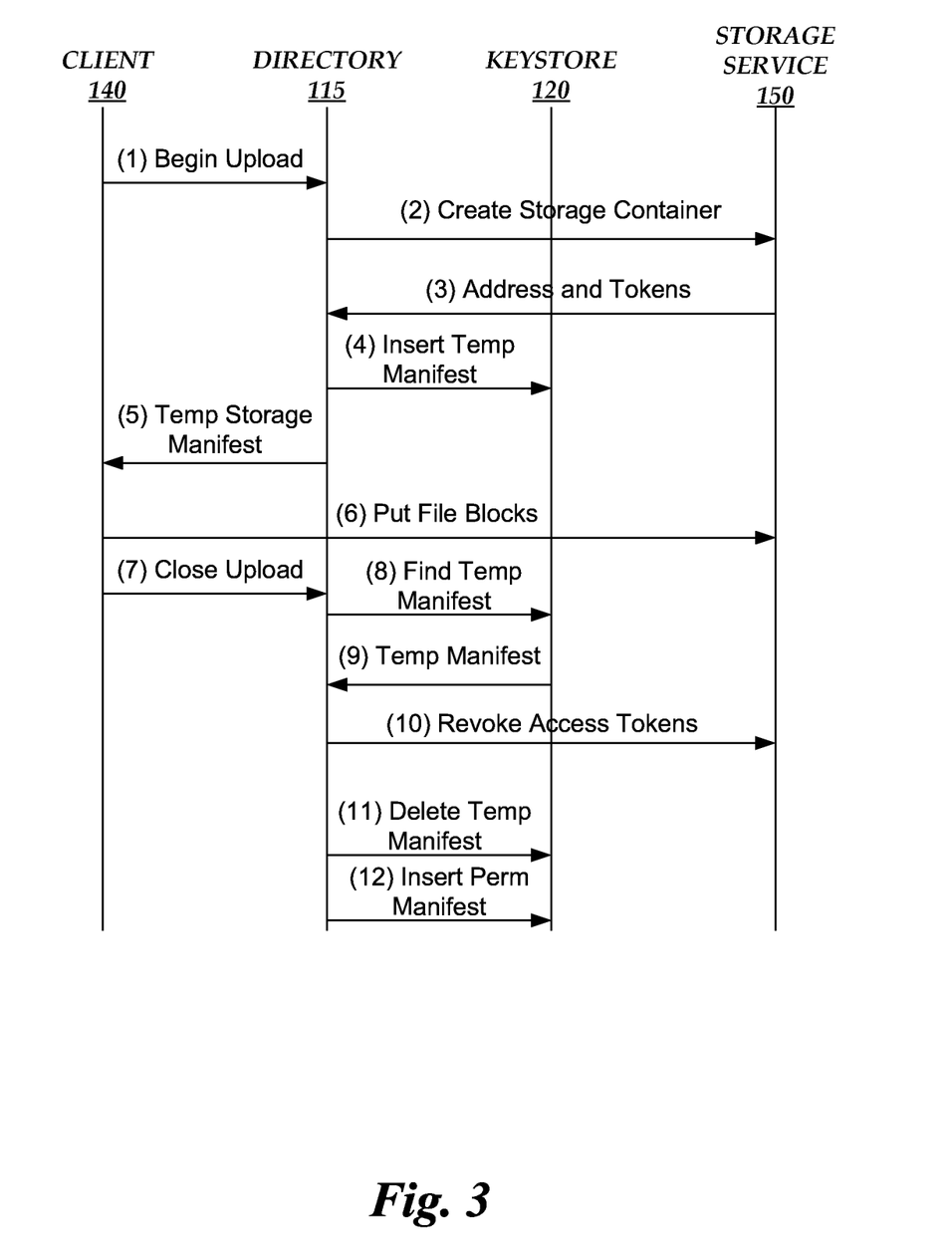
FIG. 3 illustrates a flow diagram of an embodiment of a storage routine performed by embodiments of the storage brokering system.

FIG. 3 illustrates a flow diagram of an embodiment of a storage routine performed by embodiments of the storage brokering system 100 or by one of its components, such as the directory 115 or the keystore 120. The routine is discussed in the context of an example scenario of an interaction with a client device 140 associated with a customer and a storage service 150 that is intended to illustrate, but not to limit, various aspects of the brokering system 100.

At operation (1), the client device 140 begins an upload sequence for a data set, which can include one or more electronic files. A customer may be associated with one data set or multiple data sets. The upload sequence begins with the client sending the size of the uploaded data set to the directory service 115.

At operation (2), the directory service 115 receives the size information, creates the storage container at the storage service 150 based on the size information. At operation (3), the directory service retrieves the address or location of the storage container and retrieves access tokens (e.g., authentication information such as passwords, encryption keys, security tokens, or the like) for the container. As various storage services 150 may provide different processes for accessing the storage container, the brokering system 100 can account for these variations, thereby making these access processes transparent to the customers. The directory service can also divide the data set up into multiple blocks to facilitate multi-stream upload into the storage service.

At operation (3), the directory service creates a storage manifest that, in one embodiment, contains a unique data set identifier, the storage address, and the block identifiers and places those items into a temporary collection or manifest stored, for example, in key/value storage. At operation (5), the directory service then adds the access tokens to the manifest, and sends that manifest to the client device 140. The client device 140 can then use this storage manifest to access the storage container on the storage service 150.

At operation (6), the client device 140 uses the information in the storage manifest to upload file blocks to the storage service 150. At operation (7), upon completion of the upload, the client device 140 sends the data set identifier back to the directory service 115 and notifies the directory service that the upload can be closed.

At operation (8), the directory service 115 uses the data set identifier to find the temporary manifest at the keystore 120. Optionally, at operation (9), the directory service 115 can obtain the temp manifest. In some embodiments, the directory service 115 already has the information stored in the temp manifest (e.g., from storing data from the previous transactions) and obtaining the temp manifest is unnecessary.

In one embodiment, the information in the temporary manifest is used to revoke the access tokens. At operation (10), the directory service 115 revokes the access tokens. Revoking the access tokens prevents the temp storage manifest from being reused to access the stored data. For example, if an unauthorized person intercepts or otherwise gains access to the temp storage manifest, that person will not be able to access the stored data, thereby increasing the data's security.

At operation (11), the directory service 115 instructs the keystore 120 to delete the temp manifest. At operation (12), the directory service 115 inserts a permanent manifest to the keystore 120.

The use of a temporary manifest can create a useful amount of transaction durability without having to resort to an ACID (Atomicity, Consistency, Isolation, Durability) data store. In the event that the upload fails, and the client fails to close the transaction, a periodic cleaning service can use the information in temporary manifests and the inventory of cloud storage containers to identify orphaned transactions. For example, in one embodiment, the system can check the age of temporary manifests to determine that transactions have failed, based on the assumption that transactions above a certain age where no completion message (e.g., a close transaction message) has been received from the client have failed. Another mechanism (there are several possible) can ensure that the keystore 120 itself does not lose the manifest in the event of failure. Finally, the access tokens themselves can expire after a fixed interval.

In some embodiments, one or more of the above operations (as well as other operations described herein) can include an authentication process. For example, an authentication process can be invoked when the client device 140 first attempts to access the directory 115 or the storage service 150. In one embodiment, the local storage 145 (e.g., a NAS) of FIG. 1 invokes an authentication process when the client 140 attempts to access the local storage 145 and/or when the local storage 145 communicates with the brokering system 100. Various authentication processes can be used.

In one embodiment, a password-authenticated key agreement (PAKE) method, such as Secure Remote Password (SRP) protocol is used as an authentication process. A PAKE method is an interactive method for two or more parties to establish cryptographic keys based on one or more party's knowledge of a password. For example, SRP can be used in communications between the client 140 and local storage 145 and/or between the local storage 145 and the brokering system 100. An important property is that an eavesdropper or man in the middle cannot obtain enough information to be able to brute force guess a password without further interactions with the parties for each (few) guesses. This means that strong security can be obtained using weak passwords. In addition, in SRP, the server does not store password-equivalent data so that an attacker who steals the server data cannot masquerade as the client unless they first perform a brute force search for the password.

Figure 4:
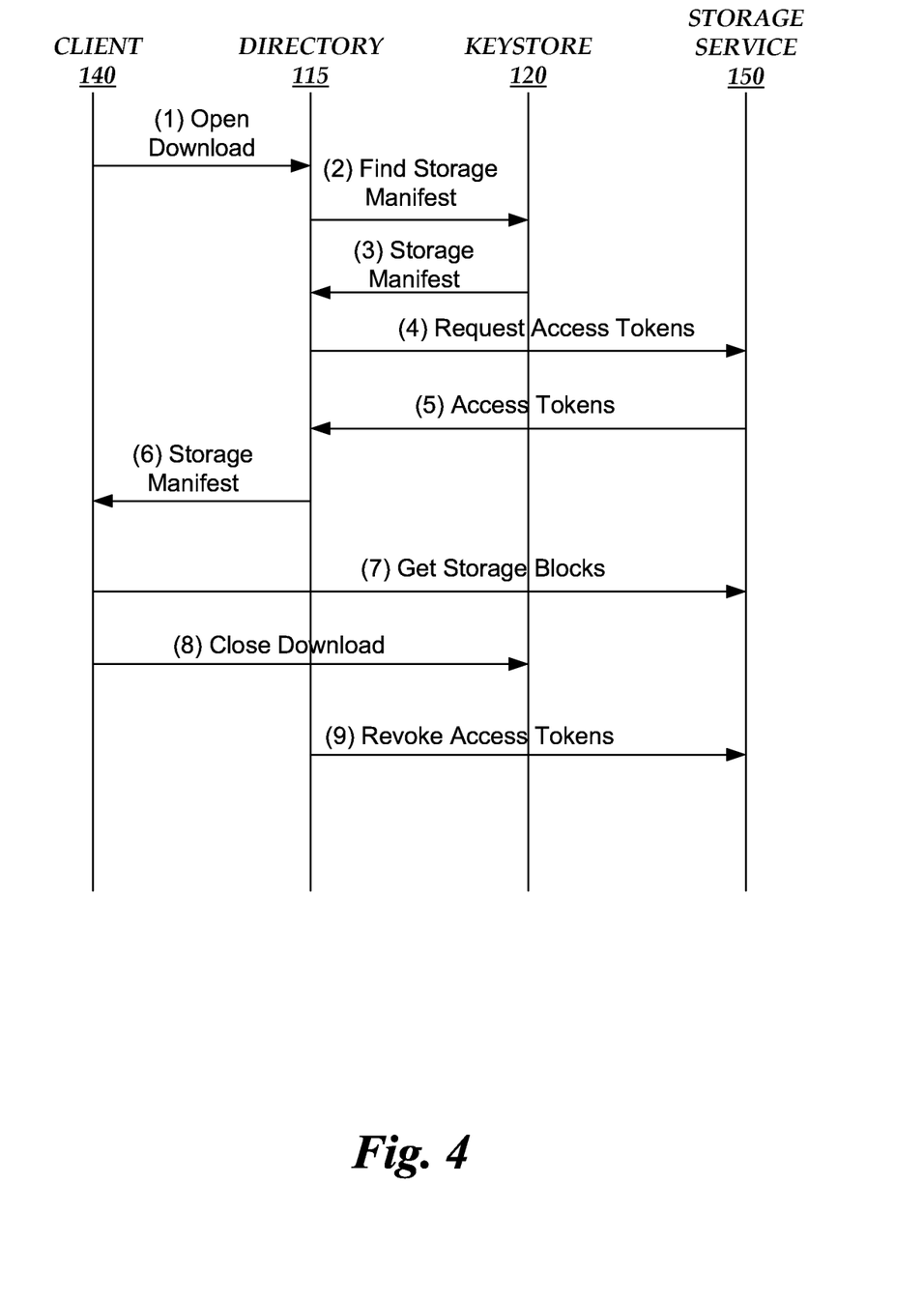
FIG. 4 illustrates a flow diagram of an embodiment of a data access routine performed by embodiments of the storage brokering system.

FIG. 4 illustrates a flow diagram of an embodiment of a download routine performed by embodiments of the storage brokering system 100 or by one of its components, such as the directory 115 or the keystore 120. The routine is discussed in the context of an example scenario of an interaction with a client device 140 associated with a customer and a storage service 150 that is intended to illustrate, but not to limit, various aspects of the brokering system 100.

At operation (1), the download sequence begins with the client device 140 sending the unique data set identifier to the directory service. In one embodiment, this is the same identifier that was provided with the manifest created during the upload sequence.

At operation (2), the directory service 115 finds the storage manifest and at operation (3), obtains the storage manifest. After obtaining the storage manifest, the directory service uses the storage address contained in the manifest for communications to the storage service 150.

At operation (4)-(6), the directory service 115 retrieves access tokens from the storage service 150, puts them in the storage manifest, and then returns the storage manifest to the client device 140. Because, in some embodiments, the storage brokering system 100 acts as an intermediary to the download request from the client 140, the system 100 is able to redirect the download as needed. For example, the system 100 may have, unbeknownst to the customer, moved the customer's data to a different storage service since the customer's data was first uploaded due to an arbitrage opportunity. The actual location of the customer's data can be transparent to the customer.

At operation (7), the client then uses the storage address and tokens to access the customer's stored data via the storage service 150. When the download is complete, the client device 140 notifies the directory service 115 using the identifying key. The directory service 115 then revokes the access tokens associated with the identifying key.

Figure 5:
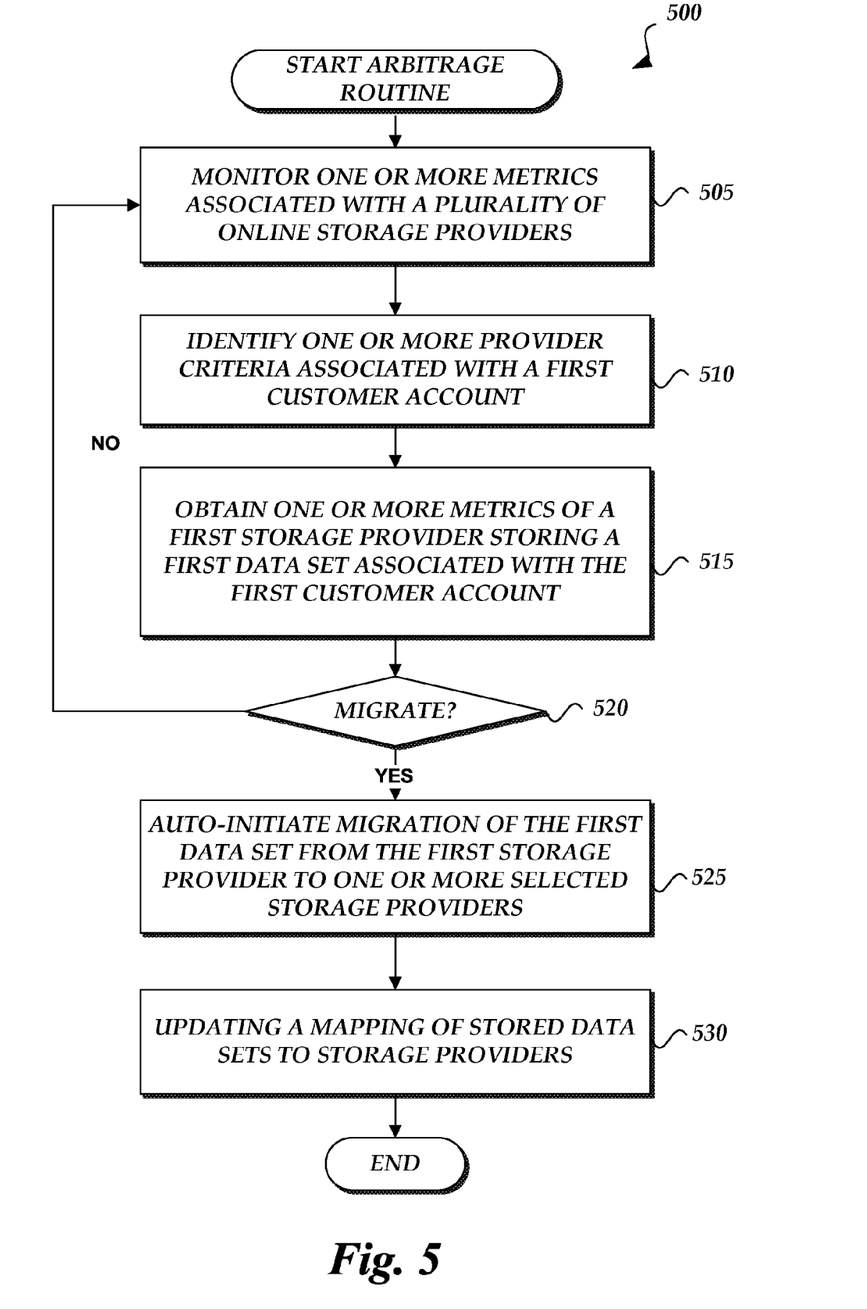
FIG. 5 illustrates a flow diagram of an embodiment of an arbitrage routine performed by embodiments of the storage brokering system.

FIG. 5 illustrates a flow diagram of an embodiment of an arbitrage routine 500 performed by embodiments of the storage brokering system 100 or by one of its components, such as the broker service 105, 200. For ease of explanation, the following describes the routine as performed by the broker service 105. The routine is discussed in the context of an example scenario that is intended to illustrate, but not to limit, various aspects of the brokering system 100.

Starting at block 505, the broker service 105 monitors one or more metrics associated with a plurality of online storage providers. For example, such metrics can include at least storage pricing, connectivity costs, capacity or availability. In some embodiments, monitoring is performed by accessing data provided by the storage providers (e.g., through a web page or API) and, optionally, storing such information on a local data repository.

At block 510, the broker service 105 identifies one or more provider criteria associated with a first customer account. As discussed above, customers can have various criteria such as cost, performance, reliability, geographic location, regulatory and the like for storage providers that store their data.

At block 515, the broker service 105 obtains one or more metrics of a first storage provider storing a first data set associated with the first customer account. For example, the broker service 105 may obtain the metrics from the storage provider, from the local data repository, or may perform tests (e.g., for performance or reliability) in order to generate the metrics.

At block 520, the broker service 105 determines whether to migrate the data from one storage provider to another. In one embodiment, if the broker service 105 identifies that an arbitrate opportunity exists, the broker service transfers the first data set, proceeding to block 525. For example, if the broker service 105 finds that a second provider has a lower cost while otherwise satisfying all other criteria of the customer, the broker service 105 can decide to transfer the data to the second provider. Otherwise, if no arbitrage opportunity exists 520, the broker service 105 takes no action and continues monitoring the online storage providers, proceeding back to block 505.

Continuing to block 525, the broker service 105 auto-initiate migration of the first data set from the first storage provider to one or more selected storage providers of the plurality of online storage providers. In one embodiment, broker service 105 is configured to automatically make such determinations without further input from the customer or an administrator. In some embodiments, the broker service 105 may report that an arbitrage opportunity exists and recommend to the customer or an administrator transfer the first data set.

At block 530, the broker service 105 updates a mapping of stored data sets to storage providers. In one embodiment, the mapping comprises of one or more storage manifests each associated with a data set. The broker service 105 can modify one of the storage manifests to disassociate the first data set from the first storage provider and associate the first data set with the one or more selected storage providers identified as providing an arbitrate opportunity.

Figure 6:
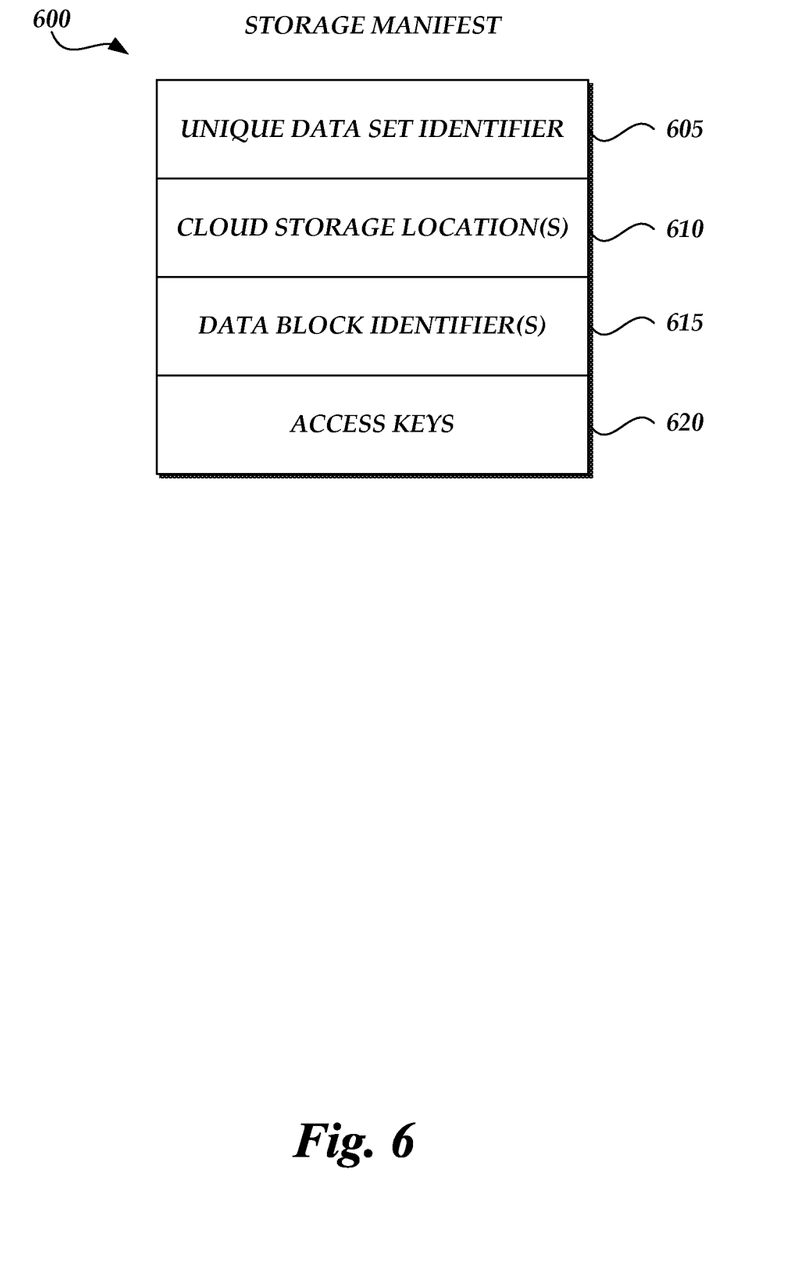
FIG. 6 illustrates an embodiment of a storage manifest for tracking a mapping of data sets to cloud storage providers.

FIG. 6 illustrates an embodiment of the storage manifest 600. The storage manifest may be an XML file, a flat file, a database entry or other data structure. In the illustrated embodiment, the storage manifest includes a unique data set identifier 605, one or more cloud storage locations 610, data block identifiers 615, and access keys 620. In one embodiment, the unique data set identifier 605 identifies the storage manifest and/or the data associated with the manifest. The storage locations 510 identify the storage services that are storing the data set. The data block identifiers can provide specific location information for the data set. For example, the data block identifiers may identify the specific files that are stored on a particular storage provider or the specific location (e.g., a network address and path) of such files. The access keys 620 can include various security tokens and authorizations (e.g., passwords, account data, etc.) for accessing the data set in one or more storage services.

In some embodiments, the above system and its components may be configured differently than illustrated in the figures above. For example, various functionalities provided by the illustrated modules can be combined, rearranged, added, or deleted. In some embodiments, additional or different processors or modules may perform some or all of the functionalities described with reference to the example embodiment illustrated in the figures above. Many implementation variations are possible.

In some embodiments, the above system and its components are executed or embodied by one or more physical or virtual computing systems. For example, in some embodiments, a server computing system that has components including a central processing unit (CPU), input/output (I/O) components, storage and memory may be used to execute some or all of the components of the above system. The I/O components can include a display, a network connection to the network, a computer-readable media drive and other I/O devices (e.g., a keyboard, a mouse, speakers, etc.).

Each of the processes, methods and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, hybrid drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

What is claimed is:

1. A system for brokering a plurality of online storage services, the system comprising:
   a memory that stores a mapping of stored data sets to online storage providers, each stored data set associated with a customer account; and
   one or more processors configured to:
      monitor one or more metrics associated with a plurality of separate online storage providers, each online storage provider associated with a different storage system;
      identify one or more provider criteria associated with a first customer account;
      obtain one or more metrics of a first online storage provider storing a first data set associated with the first customer account;
      determine whether to migrate the first data set based in part on the monitored one or more metrics, the one or more metrics of the first online storage provider, and the provider criteria;
      store the mapping in a temporary manifest;
      in response to determining to migrate the first data set, auto-initiate migration of the first data set from the first online storage provider to one or more selected online storage providers of the plurality of online storage providers in one or more data transactions, based on a first access token associated with the first online storage provider and a second access token associated with the one or more selected online storage providers, wherein the mapping comprises the first access token;
      update the mapping stored in the temporary manifest to replace the first access token with the second access token and to indicate the one or more data transactions;
      determine whether the migration completed successfully or failed;
      in response to determining that the migration completed successfully:
         store the mapping in a permanent manifest;
         delete the temporary manifest; and
         respond to a request from a client device by providing the permanent manifest to the client device, wherein the permanent manifest enables the client device to access the first data set from the one or more selected online storage providers; and in response to determining that the migration failed:
         identify orphaned data transactions based on the temporary manifest; and
         execute a cleaning service on the orphaned data transactions.

2. The system of claim 1, wherein the determination whether to migrate the first data set is performed periodically, without action from a customer.

3. The system of claim 1, wherein the one or more processors are further configured to select a time to auto-initiate the migration of the first data set based at least partly on a load of an interconnecting network between the first online storage provider and the one or more selected online storage providers.

4. The system of claim 1, wherein the one or more processors are further configured to determine the one or more selected online storage providers based at least partly on the monitored one or more metrics and the provider criteria.

5. The system of claim 1, wherein the monitored one or more metrics include at least one of storage pricing, connectivity costs, capacity, and availability.

6. The system of claim 1, further comprising a network interface in communication with a plurality of network attached storage (NAS) devices associated with a plurality of customers, the plurality of NAS devices configured to access respective data sets associated with the plurality of customers and stored by the online storage providers using the mapping.

7. The system of claim 1, wherein the one or more processors is further configured to:
identify a set of online storage providers having data centers in two or more geographically dispersed locations; and
replicate the first data set and parity data across the two or more geographically dispersed locations of the set of online storage providers such that the first data set is reconstructable from portions distributed among the set of online storage providers even if a first data center is offline.

8. A method for brokering a plurality of online storage services, the method comprising:
monitoring, by a computing system, one or more metrics associated with a plurality of separate online storage providers, each online storage provider associated with a different storage system;
identifying, by the computing system, one or more provider criteria associated with a first customer account;
obtaining, by the computing system, one or more metrics of a first online storage provider storing a first data set associated with the first customer account;
determining whether to migrate the first data set based in part on the monitored one or more metrics, the one or more metrics of the first online storage provider, and the provider criteria;
storing a mapping of stored data sets to online storage providers in a temporary manifest;
in response to determining to migrate the first data set, auto-initiating, by the computing system, migration of the first data set from the first online storage provider to one or more selected online storage providers in one or more data transactions, based on a first access token associated with the first online storage provider and a second access token associated with the one or more selected online storage providers;
updating the mapping by disassociating the first data set from the first online storage provider, associating the first data set with the one or more selected online storage providers, and replacing the first access token with the second access token, wherein the mapping comprises the first access token prior to the updating and the mapping is stored in the temporary manifest;
determining whether the migration completed successfully or failed;
responsive to determining that the migration completed successfully:
storing the mapping in a permanent manifest;
deleting the temporary manifest; and
responding to a request from a client device by providing the permanent manifest to the client device based on the request, wherein the permanent manifest enables the client device to access the first data set from the one or more selected online storage providers; and
responsive to determining that the migration failed:
identifying orphaned data transactions based on the temporary manifest; and
executing a cleaning service on the orphaned data transactions.

9. The method of claim 8, wherein the determination whether to migrate the first data set is performed periodically, without action from a customer.

10. The method of claim 8, further comprising selecting a time to auto-initiate the migration of the first data set based at least partly on a load of an interconnecting network between the first online storage provider and the one or more selected online storage providers.

11. The method of claim 8, further comprising determining the one or more selected online storage providers based at least partly on the monitored one or more metrics and the provider criteria.

12. The method of claim 8, wherein the monitored one or more metrics include at least one of storage pricing, connectivity costs, capacity, and availability.

13. The method of claim 8, further comprising providing access to the mapping, over a communications network, to a plurality of network attached storage (NAS) devices associated with a plurality of customers, the plurality of NAS devices configured to access respective data sets associated with the plurality of customers and stored by the online storage providers using the mapping.

14. The method of claim 8, wherein auto-initiating migration of the first data set comprises:
copying the first data set from the first online storage provider to the one or more selected online storage providers; and
deleting the first data set from the first online storage provider.

15. The method of claim 8, wherein auto-initiating migration of the first data set comprises:
copying the first data set from the first online storage provider to the one or more selected online storage providers; and
maintaining a copy of the first data set on the first online storage provider.

16. The method of claim 8, further comprising:
identifying a set of online storage providers having data centers in two or more geographically dispersed locations; and
replicating the first data set and parity data across the two or more geographically dispersed locations of the set of online storage providers such that the first data set is reconstructable from portions distributed among the set of online storage providers even if a first data center is offline.

17. A non-transitory computer-readable storage medium having stored thereon instructions that, when executed, direct a computing system to perform operations comprising:
monitoring one or more metrics associated with a plurality of separate online storage providers, each online storage provider associated with a different storage system;

identifying one or more provider criteria associated with a first customer account;

obtaining one or more metrics of a first online storage provider storing a first data set associated with the first customer account;

determining whether to migrate the first data set based in part on the monitored one or more metrics, the one or more metrics of the first online storage provider, and the provider criteria;

storing a mapping of stored data sets to online storage providers in a temporary manifest;

in response to determining to migrate the first data set, auto-initiating migration of the first data set from the first online storage provider to one or more selected online storage providers, based on a first access token associated with the first online storage provider and a second access token associated with the one or more selected online storage providers;

updating the mapping by disassociating the first data set from the first online storage provider, associating the first data set with the one or more selected online storage providers, and replacing the first access token with the second access token, wherein the mapping comprises the first access token prior to the updating and the mapping is stored in the temporary manifest;

determining whether the migration completed successfully or failed;

responsive to determining that the migration completed successfully:
  storing the mapping in a permanent manifest;
  deleting the temporary manifest; and
  responding to a request from a client device by providing the permanent manifest to the client device, wherein the permanent manifest enables the client device to access the first data set from the one or more selected online storage providers; and responsive to determining that the migration failed:
  identifying orphaned data transactions based on the temporary manifest; and
  executing a cleaning service on the orphaned data transactions.

18. The non-transitory computer-readable storage medium of claim 17, wherein the determination whether to migrate the first data set is performed periodically, without action from a customer.

19. The non-transitory computer-readable storage medium of claim 17, wherein the operations further comprise:
  selecting a time to auto-initiate the migration of the first data set based at least partly on a load of an interconnecting network between the first online storage provider and the one or more selected online storage providers.

20. The non-transitory computer-readable storage medium of claim 17, wherein the operations further comprise:
  providing access to the mapping, over a communications network, to a plurality of network attached storage (NAS) devices associated with a plurality of customers, the plurality of NAS devices configured to access respective data sets associated with the plurality of customers and stored by the online storage providers using the mapping.

* * * * *